United States Patent [19]

Gimpel

[11] Patent Number: 4,529,750
[45] Date of Patent: Jul. 16, 1985

[54] CROSSLINKABLE POLYOLEFIN COMPOSITIONS CONTAINING SYNTHETIC ZEOLITE MOLECULAR SIEVES

[76] Inventor: Franco Gimpel, Via F. Nullo 18, 20129 Milano, Italy

[21] Appl. No.: 591,992

[22] Filed: Mar. 21, 1984

[30] Foreign Application Priority Data

Mar. 9, 1984 [IT] Italy ................ 19967 A/84

[51] Int. Cl.³ ............................................ C08K 3/34
[52] U.S. Cl. ................................ 523/210; 523/211; 523/300; 524/450; 524/529; 524/791
[58] Field of Search ............... 523/210, 211, 300; 524/450, 791, 866, 529; 526/194

[56] References Cited

U.S. PATENT DOCUMENTS

| | | | |
|---|---|---|---|
| 3,341,488 | 9/1967 | O'Connor | 523/211 |
| 3,644,273 | 2/1972 | Mills | 524/450 |
| 4,124,562 | 11/1978 | Yui et al. | 524/450 |

FOREIGN PATENT DOCUMENTS

| | | |
|---|---|---|
| 1286460 | 8/1972 | United Kingdom . |
| 1522760 | 8/1978 | United Kingdom . |

*Primary Examiner*—Lewis T. Jacobs
*Attorney, Agent, or Firm*—Stevens, Davis, Miller & Mosher

[57] ABSTRACT

Crosslinkable polymeric compositions based on polyolefins modified by grafting on to them hydrolyzable unsaturated alkoxy silanes, such grafting being carried out in the presence of a partially or totally dehydrated synthetic crystalline zeolite and of a free radical generating peroxide catalyst.

10 Claims, No Drawings

CROSSLINKABLE POLYOLEFIN COMPOSITIONS CONTAINING SYNTHETIC ZEOLITE MOLECULAR SIEVES

It is known to crosslink polyethylene and other olefins by siloxane crosslinking whereby in a first step unsaturated hydrolizable silanes are grafted onto the polyolefin chain, usually in an extruder at temperatures above 140° C. and in the presence of free radical generating catalysts, such as dicumyl peroxide, and subsequently the grafted polymer is exposed to moisture in the presence of a silanol condensation on catalyst. Similar processes are described in patents GB No. 1234 034, GB Nos. 1286.460 and 3646.155.

Such siloxane crosslinking processes however require the use of organo-functional silanes which are easily hydrolyzed and consequently present poor stability during storage and difficulties in handling. In fact the conventional alkoxy silanes used in commercial processes and particularly vinyltrimethoxysilane and vinyl triethoxysilane are liquid additives which readily undergo hydrolysis under the effect of humidity, both during storage and during the grafting process due to traces of residual humidity present in the polymer, giving rise to the formation of oligomers in accordance with the following general reaction:

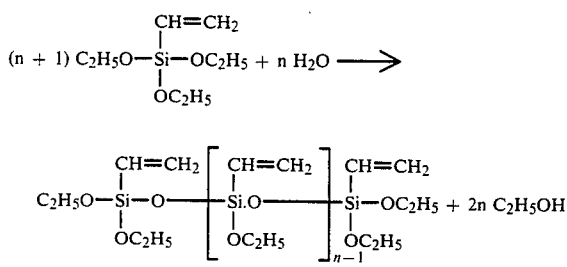

where n = 3–6.

The presence of these oligomers does not allow the polyolefins to be grafted with a high yield thus negatively influencing the quality of the crosslinked materials. The strong polar character of the unsaturated hydrolizable silane makes it difficult to homogeneously mix with the polyolefin both the silane itself, which is a volatile liquid with low miscibility with the polyolefin, and other additives such as the organic peroxides which can be dissolved in the silane.

Proceeding in accordance with known methods the following difficulties are also encountered:

premature peroxide crosslinking takes place during grafting;

the grafted polyolefin does not exhibit satisfactory storage properties due to premature siloxane crosslinking caused by traces of humidity in the polymer; and the distribution of the grafted silane is not sufficiently homogeneous, the same being true for subsequent crosslinking of the polyolefin.

An approach which attempts to overcome these difficulties by pre-mixing the polyolefin with the liquid additives at temperatures of 70°–90° C. is described in the German patent DOS No. 2.617.108, but this does not provide an adequate solution to the above-mentioned difficulties and furthermore is not applicable to High Density Polyethylene. It is the object of the present invention to obtain a crosslinkable silane-grafted polyolefin having the following advantages compared with known methods:

improved storage stability of the grafted polyolefin;

a more homogeneous distribution of the silane grafted onto the polyolefin chains, and a higher grafting yield are obtained and thus the polyolefins are subsequently crosslinked with a higher and more uniform crosslinking density; and the grafted polyolefin compositions crosslink more rapidly either by exposure to humidity or by heat treatment or by exposure to microwaves or by a combination of these treatments.

These advantages are achieved, according to the present invention, by grafting the unsaturated hydrolizable silane onto the polyolefin in the presence of a partially or totally dehydrated synthetic molecular sieve which thus remains incorporated in the grafted polymer.

The amount of zeolite to be used in comprised between 25 and 500 parts by weight, preferably 50 to 150 parts, per 100 parts by weight of silane.

In a preferred embodiment of the present invention the grafting step is carried out using a combination of the silane and the zeolite which is prepared previously using, for example, a ball mill or other apparatus suitable for dispersing and homogeneously mixing a liquid with a solid in powder form. The liquid silane is preferably introduced first into the apparatus, and then the zeolite powder is added, with the mixing being carried out for about 10 to 20 minutes.

The silane can also be diluted with suitable solvents. In a particular embodiment of the present invention various additives can be adsorbed on the zeolite such as the free radical generating grafting catalyst and other additives which shall not, however, adversely affect the grafting reaction.

The unsaturated alkoxy silanes contained in the combination with zeolite can be grafted onto the polyolefin using conventional methods such as, for example, uniformly mixing together in a high speed mixer, such as a Henschel mixer, the polyolefin and the silane-zeolite combination together with the grafting catalyst and other additives.

This uniform mixture is then fed, for example, to an extruder in which the components are first homogenized followed by the grafting reaction at temperatures comprised between 160°–250° C., preferably 180°–220° C., in the presence of suitable grafting catalysts, such as organic peroxides, and other additives. The unsaturated hydrolizable silanes which can be used for the purpose of the present invention are those generally used in the known methods for crosslinking of polyolefins such as vinyl triethoxysilane, vinyl trimethoxysilane, gamma-methacryloxypropyl trimethoxy-silane and others such as vinyl triacetoxysilane, vinyl methyldimethoxysilane etc.

The suitable types of silanes are defined, for example, in U.S. Pat. No. 3,646,155.

The polyolefins to which the present invention can be applied include homopolymers and copolymers of ethylene and propylene such as, for example:

high, medium and low density polyethylene, copolymers of ethylene and propylene and/or mono-olefins (e.g. Butene-1, Hexene-1);

ethylene-vinylacetate and ethylene-acrylate copolymers; and thermoplastic rubbers consisting of ethylene-propylene copolymer or ethylene/propylene/diene termopolymer.

For the purpose of this invention the term "zeolite" refers to the synthetic crystalline alluminum silicates of one or more alkaline or alkali-earth metals as defined by D. W. Breck in "Zeolite molecular Sieves" Wiley Interscience (1974) pages 133 to 180.

Such zeolites correspond to the general formula:

$$Me_{2/x}O.Al_2O_3.YSiO_2.ZH_2O$$

where:

Me is a metal, preferably an alkaline or alkali-earth metal

X is the valency of the metal

Y is the $SiO_2/Al_2O_3$ ratio which can vary, for a given type of zeolite as follows:

Y=1.8–2.1 for zeolite A
Y=2–3 for zeolite X
Y=3–6 for zeolite Y and for certain types of zeolite Y can reach 100

Z is the degree of hydration of the zeolite which can vary from 0 to 9 according to the type of zeolite.

The synthetic zeolite powders used in accordance with the present invention are partially or totally dehydrated Molecular Sieves (i.e. activated by heat treatment) and can be chose, for example, among:

type A zeolites, such as 3A, 4A and 5A;
type X zeolites, preferably zeolite NaX; and
type Y zeolites.

Naturally one can also employ a mixture of the above zeolites. Type Z zeolite molecular sieves correspond to the typical formula:

$$Na_2O.Al_2O_3.2SiO_2$$

where the Na+ cation in the three-dimensional crystalline structure can be replaced by other cations such as K+ (zeolite 3A) or Ca++ (zeolite 5A).

Type X zeolite molecular sieves correspond to the typical formula:

$$Na_2O.Al_2O_3.2.4SiO_2$$

while type Y zeolite molecular sieves correspond to the typical formula:

$$Na_2O.Al_2O_3.4.8SiO_2$$

The grafting initiators which can be used in accordance with the present invention are the conventional organic peroxides capable of generating free radicals at grafting temperatures in the range of 160°–250° C., such as dicumyl peroxide and others, or combinations of various peroxydic initiators such as, for example, a combination of 1,3 bis(tert.butylperoxyisopropyl)benzene and tert.butyl-peroxy-isononanoate and others. During the grafting reaction, other additives may be present such as suitable antioxidants, activators, crosslinking coagents etc. which do not however adversely influence the graft reaction.

Some of these additives, such as the grafting initiators and the crosslinking coagents, may be dissolved in the silane or in suitable solvents or supported on the zeolite: this last case being particularly advantageous also because it allows the additive to be more evenly dispersed and homogenized throughout the bulk of the molten polymer. The amount of the peroxydic grafting initiator is comprised, in accordance with known methods, between 0.05% and 1% by weight on the polymer, preferably 0.05–0.2% by weight.

SHAPING AND CROSSLINKING

The polyolefins grafted in accordance with the process of this invention can be shaped by conventional means (e.g. by extrusion, injection molding etc.) possibly, but not necessarily, after adding a conventional crosslinking catalyst (such as dibutyltin dilaurate) or a crosslinking coagent consisting of an arylcarboxylic or arylsulphonic acid having a melting point higher than that of the initial polyolefin (e.g. p.tert-butylbenzoic acid) of the type described in the Italian patent application 24121 A/83 filed Dec. 12, 1983. Normally 1–25 parts by weight of crosslinking coagent are used for 100 parts by weight of zeolite.

Both the crosslinking catalyst and the crosslinking coagent may be added before or after grafting the silane on to the polyolefin; in the latter case they can be added preferably in the form of a masterbatch.

The crosslinking coagent may be added after having been chemi-adsorbed on the zeolite (Chemically Loaded Molecular Sieve).

The shaped articles are crosslinked, in a shorter space of time than that of the prior art, by exposure to moisture and/or heat exposure to microwave radiation as described in the above mentioned Italian patent application 24121 A/83.

Crosslinking can be carried out rapidly and with very satisfactory results even without the conventional silane crosslinking catalysts.

EXAMPLE 1 (REFERENCE TEST)

100 parts by weight of high density Polyethylene (HDPE) granules (commercially denominated Marlex EHM 6001 produced by Phillips with a density of 0.96 and a Melt Flow Index=0.15 g/10 min. ASTM D 1238/E) are uniformly mixed with 3 parts by weight of vinyl-triethoxysilane (produced by Union Carbide Corp., denominated organo-functional silane A 151) in which 0.12 parts by weight of dicumyl peroxide have been previously dissolved.

The mixture is now extruded in a twin screw Werner & Pfleiderer ZK-28 laboratory extruder, equipped with interpenetrating screws, both revolving in the same sense, at temperatures of 165° to 220° C. and then granulated with air cooling.

The grafted base resin thus obtained had a MFI=1.98 g/10 min. ASTM D 1238/F.

The grafting yield measured on a sample extracted with boiling toluene and then analyzed by vapor phase chromatography was found to be 75% by weight.

A 1% silanol condensation catalyst Masterbatch is prepared separately by blending 100 parts of the same ungrafted HDPE mentioned previously with one part of dibutyltin dilaurate and 0.12 parts of cumylperoxide. After extruding and granulating this composition, a product is obtained having a Melt Flow Index=1.9 g/10 min. ASTM D 1238/F.

95 parts by weight of the grafted base resin in granules are dry mixed for about 20 min. with 5 parts by weight of the above mentioned catalyst Masterbatch and then granulated in an extruder.

The crosslinkable granule thus obtained has a M.F. Index=0.56 g/10 min. ASTM D 1238/F and no significant insoluble gel formation is observed after xylene extraction of a sample.

By compression molding of the crosslinkable granules a 2 mm thick sheet is obtained from which 20×20 mm samples are cut. These are then crosslinked by exposure to steam at 100° C. for 48 hours.

On these samples the Swelling Index Q and the insoluble gel content are determined by extracting a sample piece of weight $W_A$ in boiling xylene for 20 hours.

If $W_Q$ is the weight of the sample piece after extraction and $W_E$ is the weight of the same after drying for 8 hours at 140° C., then:

$$\text{Swelling Index } Q = \frac{W_Q}{W_E}$$

$$\text{Insoluble gel content } G = \frac{W_E}{W_A} \cdot 100\%$$

In this example the results are:
Swelling Index Q=12
Insoluble gel content G=68%

EXAMPLE 2

(A) Preparation of the combination of unsaturated alkoxy silane and zeolite 100 parts by weight of activated zeolite 4A in powder form (commercially denominated Baylith T produced by Bayer A.G.) and 100 parts by weight of vinyl triethoxysilane (commercially denominated Organo Functional Silane A 151 produced by Union Carbide) in which 5 parts by weight of dicumyl peroxide have previously been dissolved, are dispersed and homogenized in 1 liter a ball mill for 10–20 minutes.

(B) Grafting and crosslinking 100 parts by weight of HDPE (Marlex EHM 6001 as in Example 1) are uniformly mixed for 30 seconds in a Henschel rapid mixer at 2000 RPM with 5 parts by weight of the above silane-zeolite combination and with 0.05 parts by weight of Irganox 1010 antioxidant.

The composition is now extruded in a twin-screw Werner Pfleiderer extruder as in Example 1 and then granulated. On a sample of this grafted resin the grafting yield is determined as in Example 1 and is found to be 83% by weight. A Masterbatch of crosslinking coagent is prepared separately consisting of 99 parts by weight of the same HDPE described above and 1 part by weight of p.tert.butylbenzoic acid. 95 parts by weight of the grafted resin are now tumble mixed for 20 minutes with 5 parts by weight of the above Masterbatch and the mixture is then granulated in an extruder. From the grafted granules thus obtained samples are made by compression molding, as in Example 1, and are then crosslinked by exposure to steam at 100° C. for 2 hours. The insoluble gel content of the crosslinked samples is 76% and the Swelling Index Q is equal to 8. These results show that operating in accordance with the present invention crosslinking time is considerably reduced (2 hours instead of 48 hours) and the following advantages are achieved, compared with products obtained by conventional methods:

(a) the grafting yield is higher;
(b) the crosslinked articles have a lower Swelling Index Q and consequently are crosslinked with a more uniform crosslinking density; and
(c) the crosslinked articles have a higher insoluble gel content and consequently have a higher degree of crosslinking.

EXAMPLE 3

Crosslinkable samples are prepared employing the procedure of Example 2 except that after compression molding the samples are preheated to 100° C. and then crosslinked in a microwave oven (Philips type 2010C from which the notating plate has been removed) by exposure for 6 minutes to microwaves having a frequency of 2450 MHz and an output power of 2.1 kw.

After cooling, the insoluble gel content of the samples is determined, which amounts to 73%, and also the Swelling Index Q which is equal to 7.5.

The above results clearly show that:

(a) the compositions obtained in accordance with the present invention are crosslinkable by exposure to microwave radiation and crosslinking takes place in considerably shorter times than these of conventional methods; and (b) the crosslinked articles are characterized by a higher degree of crosslinking and a lower Swelling Index i.e. by a more uniform crosslinking density.

I claim:

1. Crosslinkable polymeric compositions comprising polyolefins modified by grafting onto said polyolefins hydrolyzable unsaturated alkoxy silanes, said grafting being carried out in the presence of a partially or totally dehydrated synthetic crystalline zeolite molecular sieve, said sieve comprising between 25 and 500 parts by weight per 100 parts by weight of said silane, and in the presence of a free radical generating peroxide initiator at temperatures between 160° and 250° C.

2. Polymeric compositions as claimed in claim 1, wherein said zeolite is selected from the type consisting of 3A, 4A, 5A, X and Y molecular sieves.

3. Polymeric compositions as claimed in claim 1, further comprising using a pre-prepared combination of said silane and said zeolite in grafting said silane onto said polyolefin.

4. Polymeric compositions as claimed in claim 1, wherein said peroxidic grafting initiator is previously adsorbed on the zeolite.

5. Polymeric compositions as claimed in claim 1, further comprising a crosslinking coagent consisting of an arylcarboxylic or arylsulphonic acid having a melting point higher than that of the initial polyolefin, wherein 1–25 parts by weight of said acid is combined with 100 parts of said zeolite.

6. Polymeric compositions as claimed in claim 5, wherein said crosslinking coagent is previously chemiadsorbed on said zeolite.

7. Articles comprising crosslinked polymers obtained from polymeric compositions as claimed in claim 1 by shaping and subsequent crosslinking by exposure to water in liquid or vapor form in the presence of conventional silane crosslinking catalysts.

8. Articles comprising crosslinked polymers obtained from polymeric compositions as claimed in claim 1 by shaping and subsequent crosslinking by exposure to heat in the presence of conventional silane crosslinking catalysts.

9. Articles comprising crosslinked polymers obtained from polymeric compositions as claimed in claim 1 by shaping and subsequent crosslinking by exposure to microwave radiation in the presence of conventional silane crosslinking catalysts.

10. Crosslinkable polymeric compositions as claimed in claim 1 wherein said grafting is carried out at temperatures between 180° and 220° C.

* * * * *